US008823188B2

(12) United States Patent
Sadarnac et al.

(10) Patent No.: US 8,823,188 B2
(45) Date of Patent: Sep. 2, 2014

(54) PORTABLE MECHATRONICAL DEVICE FOR GENERATING ELECTRIC POWER

(75) Inventors: Daniel Sadarnac, Solignac (FR); Didier Marquet, Malakoff (FR)

(73) Assignee: Orange, Paris (FR)

( * ) Notice: Subject to any disclaimer, the term of this patent is extended or adjusted under 35 U.S.C. 154(b) by 810 days.

(21) Appl. No.: 12/988,850

(22) PCT Filed: Apr. 17, 2009

(86) PCT No.: PCT/FR2009/050722
§ 371 (c)(1),
(2), (4) Date: Oct. 21, 2010

(87) PCT Pub. No.: WO2009/138645
PCT Pub. Date: Nov. 19, 2009

(65) Prior Publication Data
US 2011/0037260 A1 Feb. 17, 2011

(30) Foreign Application Priority Data
Apr. 22, 2008 (FR) ...................................... 08 52697

(51) Int. Cl.
*F02B 63/04* (2006.01)
*F03B 13/10* (2006.01)

(52) U.S. Cl.
USPC ............................................ 290/1 R; 290/42

(58) Field of Classification Search
USPC ......... 290/1 R, 42; 310/13, 15, 19, 36, 39, 37
See application file for complete search history.

(56) References Cited

U.S. PATENT DOCUMENTS

| 3,609,426 | A | * | 9/1971 | Gaul | 322/4 |
| 3,696,251 | A | * | 10/1972 | Last et al. | 290/53 |
| 3,778,697 | A | | 12/1973 | Link et al. | |
| 5,164,641 | A | * | 11/1992 | Quibel et al. | 318/128 |
| 5,347,186 | A | * | 9/1994 | Konotchick | 310/17 |
| 7,218,018 | B2 | * | 5/2007 | Hasegawa et al. | 310/12.33 |
| 2001/0007400 | A1 | * | 7/2001 | Griswold | 310/14 |
| 2003/0020281 | A1 | | 1/2003 | Beal | |

(Continued)

FOREIGN PATENT DOCUMENTS

| EP | 1231706 | | 8/2002 | | |
| FR | 2930690 | A1 * | 10/2009 | ............... | H02K 3/47 |

OTHER PUBLICATIONS

Ruellan, M. et al., Electromagnetic Resonant Generator, Satie UMR CNRS 8029, Brittany Branch ENS de Cachan, IEEE IAS Annual Meeting, Hong Kong, CDROM proc., Oct. 2-6, 2005.

*Primary Examiner* — Julio R. Gonzalez
(74) *Attorney, Agent, or Firm* — Knobbe Martens Olson & Bear LLP

(57) ABSTRACT

The device includes, in a housing, an actuator electrically connected to a battery for charging a portable item such as a mobile terminal. For a rotating actuator comprising a first member submitted to an oscillatory motion, for example a walker carrying the housing, and a second member making up at least partially a mass part, the mass part is able to oscillate around the axle of the armature with respect to the first member. A servo control system can control the actuator sometimes as a motor supplied by the battery or by allowing the mass part to move freely, sometimes as a generator charging the battery, by slaving the motion speed of the mass part to the acceleration of the oscillatory motion of the first member. This enables to recover as much electric power as possible from the walker.

14 Claims, 5 Drawing Sheets

(56) References Cited

U.S. PATENT DOCUMENTS

| | | |
|---|---|---|
| 2004/0222708 A1 | 11/2004 | Hobson et al. |
| 2004/0251750 A1* | 12/2004 | Cheung et al. .................. 310/23 |
| 2010/0187835 A1* | 7/2010 | Hohlfeld et al. .............. 290/1 R |
| 2010/0194117 A1* | 8/2010 | Pabon et al. .................. 290/1 R |

\* cited by examiner

PORTABLE MECHATRONICAL DEVICE FOR GENERATING ELECTRIC POWER

RELATED APPLICATIONS

The present application is based on, and claims priority from, PCT Application No. PCT/FR09/050722, filed Apr. 17, 2009, and FR Application Number 0852697, filed Apr. 22, 2008, the disclosures of which are hereby incorporated by reference herein in their entireties.

The present invention relates to a method and an electric power generating device based on the recovery of power from the natural oscillatory motion of a system having accelerations in opposite directions. The natural oscillatory motion system is for example a walker carrying a housing of the device hung on his waist.

The article "*Electromagnetic resonant generator*" by M. Ruellan, S. Turri, Hamid Ben Ahmed and B. Multon, IEEE IAS annual meeting, Hong Kong, CDROM proc., 2-6 Oct. 2005, discloses an electrical power generator system comprising a synchronous electromagnetic linear actuator with a tubular structure whose permanent magnet inductor is fastened to a box and whose armature is fastened to a mobile mass part coupled to the box by damping springs. The armature is electrically connected to an electric power storing means. A box of the device is carried at the hip level of a walker whose motion is considered as substantially sinusoidal. The actuator is passive with respect to the mobile mass part and only operates as an electric generator for recharging, for example, the electric power storing means, for example, the battery of a cellular phone. The recovered power increases with the frequency of the walker's steps.

For natural movements such as those of the human body, the oscillations are at a low frequency. In such conditions, the power to be recovered by the generator system according to the above described article is very low. Thus, with such an electromagnetic generator system carried at the hip by a walker, the mean power to be recovered is lower than 40 mW for a mobile mass part of 50 g and a pace of two steps per second.

The present invention overcomes the above mentioned drawbacks with an electric power generating method by means of an actuator electrically connected to an electric power storing means and comprising a first member able to be submitted to an oscillatory speed motion and a second member making up at least partially a mass part able to oscillate in speed with respect to the first member.

Such as method includes servo-controlling the motion of the mass part to the oscillatory motion of the first member to control the actuator as a generator charging the storing means during a part of an operating cycle of the actuator, the mass part freely moving during another part of the operating cycle of the actuator.

The first and second members are for example a peripheral armature and a central inductor of the actuator of the magnet synchronous rotating machine type. On larger machines, the magnets can be replaced by electromagnets.

The actuator according to the invention is provided for generating electric power, for example for recharging the battery of a portable item, and then operates as a generator for charging the electric power storing means to be connected to the battery of the portable item. The mass part can then move freely during another part of the operating cycle of the actuator.

This invention also relates to an electric power generating method by means of an actuator (11-12, 21-22) electrically connected to an electric power storing means (16, 26) and comprising a first member (11, 21) able to be submitted to an oscillatory speed motion and a second member (12, 22) making up at least partially a mass part (13, 23) able to oscillate in speed with respect to the first member.

Such a method is special in that it includes:
servo-controlling the motion of the mass part to the oscillatory motion of the first member to control the actuator as a generator charging the storing means during part of an operating cycle of the actuator,
servo-controlling the motion of the mass part to the oscillatory motion of the first member to control the actuator as a motor supplied by the storing means during another part of the operating cycle of the actuator (11-12, 21-22).

In order to recover as much electric power as possible from the natural oscillatory motion system, such as a walker carrying the actuator with the mass part, the operation of the actuator is reversible so that another part of the operating cycle of the actuator is able to include a servo-control of the motion of the mass part to the oscillatory motion of the first member for controlling the actuator as a motor supplied by the storing means. In such a case, the actuator operates either as a motor to accelerate the mass part, or as a generator to recover the kinetic power of the mass part, following the servo-control to the oscillatory motion of the first member that is submitted to that of the natural oscillatory system. Such a servo-control allows much more power to be recovered than by means of the passive actuator according to the prior art.

In particular, the servo control system can occur requiring that the motion speed of the mass part is slaved to the acceleration of the first member.

Thanks to such a servo-control, the method of the invention helps to draw as much power as possible from the moving system, while ensuring little discomfort to the walker because of the weight, the vibrations and the noise that can be generated by the actuator. The larger the deflection of the mass part and/or the stronger the accelerations it is submitted to, the higher the power to be recovered, all the more as the oscillatory motion of the natural oscillatory system is slow.

The method assists drawing power on a system with a low motion by nature, through more quickly implementing artificial motions of the mobile mass for recharging the electric power storing means, such as a micro-accumulator for example supplying a cellular mobile terminal. To this end, the operating cycle of the actuator can include an operating phase of the actuator as a motor for increasing the motion speed of the mass part according to a predetermined direction during an increase of the acceleration of the first member according to a direction opposite to the predetermined direction, an operating phase of the actuator as a generator for decreasing the motion speed of the mass part according to the predetermined direction during a decrease of the acceleration of the first member according to the opposite direction, an operating phase of the actuator as a motor for increasing the motion speed of the mass part according to the opposite direction during an increase of the acceleration of the first member according to the predetermined direction, and an operating phase of the actuator as a generator for decreasing the motion speed of the mass part according to the opposite direction during a decrease of the acceleration of the first member according to the predetermined direction.

The variation being imposed for the speed of the mass part as a function of the time can be for example substantially sinusoidal, trapezoidal, or of the same type as the acceleration of the housing.

In order to better optimize the recovery of power by the electric power storing means, the motion speed of the mass part whatever the direction thereof can be maintained in synchronism with absolute value maxima of the inductor acceleration. Otherwise stated, the operating cycle of the actuator can include operating phases for the actuator as a motor to increase and decrease the motion speed of the mass part when the acceleration of the first member varies around a maximum.

An object of this invention is also to provide an electric power generating device including an actuator electrically connected to an electric power storing means and comprising a first member able to be submitted to an oscillatory speed motion and a second member making up at least partially a mass part able to oscillate in speed with respect to the first member. The device is characterized in that it includes a servo-control means for controlling the actuator as a generator charging the storing means, by slaving the motion of the mass part to the oscillatory motion of the first member during a part of an operating cycle of the actuator.

The servo-control means can also be able to control the actuator as a motor supplied by the storing means for another part of the operating cycle of the actuator. According to a more economic alternative able to generate less electric power, the actuator is not supplied and the mass part can move freely during the other part of the operating cycle of the actuator.

More particularly, the servo-control means can include means for measuring an acceleration of the first member, means for measuring a motion speed of the mass part, and means controlling the actuator for making the motion speed of the mass part slaved to the acceleration of the first member. The slaved making means can include means for correcting a parameter depending on the measured acceleration of the first member and the measured motion speed of the mass part with respect to a variable set point depending on the position of the first member, and a reversible amplifier-undulator for adapting the variations of the electric power either to be recovered from the actuator or to be supplied to the actuator to direct current and voltage on the terminals of the storing means according to the corrected parameter.

Different combinations of the motion of the mass part and the type of actuator can help to achieve the device of the invention. According to a first embodiment, the motion of the mass part is linear whereas the actuator is linear or rotating. The natural oscillation from which the power is to be drawn can be vertical or oriented according to another direction.

According to a second embodiment, the motion of the mass part is rotating and the actuator is rotating. In such a second embodiment, the servo-control means can be able to vary the motion speed of the mass part around a nominal speed higher than the maximum angular speed of the first member in order to draw more power. In this second embodiment, for improving the walker's comfort, the first member of the actuator can be supported by a housing fastened to the natural oscillatory motion system and rotatably uncoupled from the first member for example by uncoupling means such as at least one ball bearing.

In order to better assist the actuator to draw power from the natural oscillatory motion system and to increase the miniaturization of the device, the latter can include a resilient means fastened to a housing supporting the actuator for assisting the actuator to accelerate the mass part when the actuator operates as a motor. The servo-control of the mass part and the resilient means can then relate not only to the motion speed of the mass part, but also to the stiffness of the resilient means and/or to the motion of counterweights movable for example on a rod being diametrical to the axis of the actuator.

Adjusting the inertia moment of the moving mass part can also occur through moving a liquid with respect to the rotation axis, whereas the resilient means can be itself embodied through a compressible fluid having its stiffness adjusted acting on the pressure thereof.

Other characteristics and advantages of the present invention will become more clearly apparent from reading the following description of several embodiments of the invention, given by way of non-limiting examples, with reference to the corresponding appended drawings in which.

Figure 1:
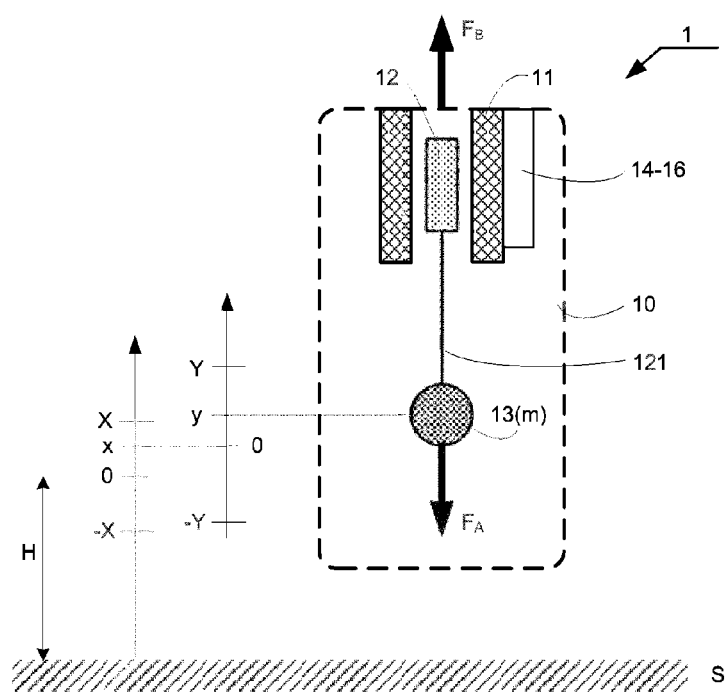
FIG. 1 is a schematic axial sectional view of an electric power generating device according to the first embodiment of the invention.
Figure 3:
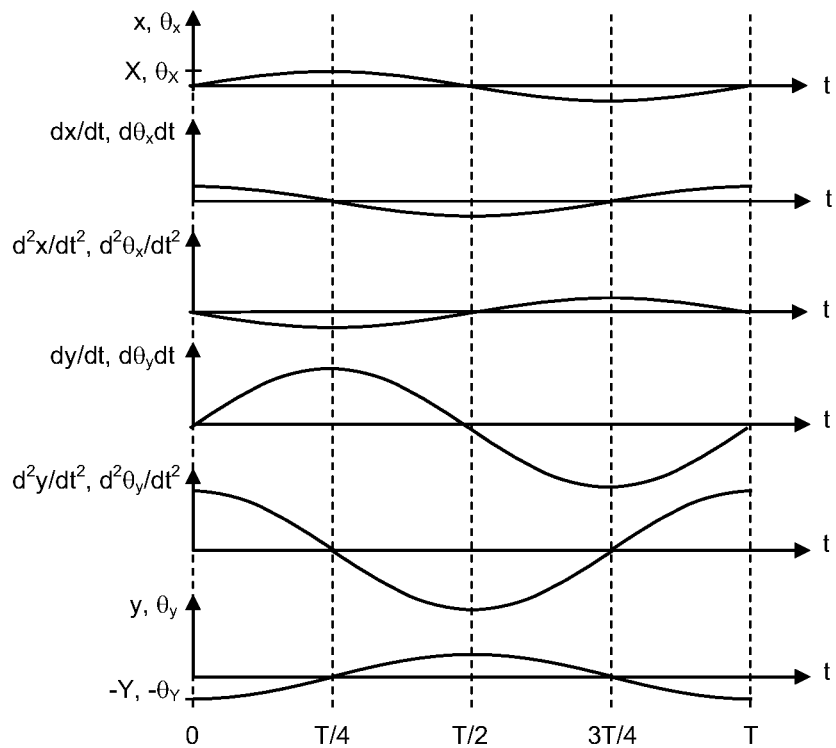
Figure 4:
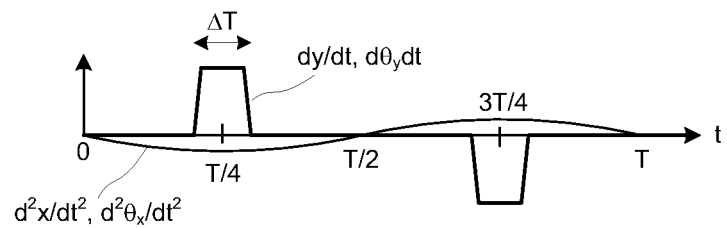
Figure 5:
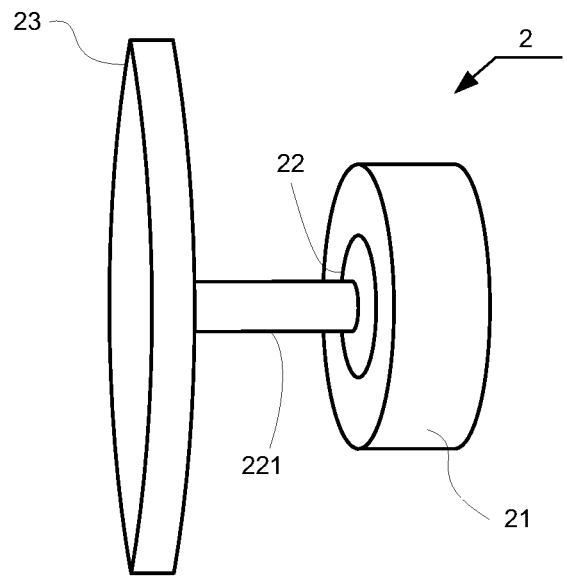
Figure 6:
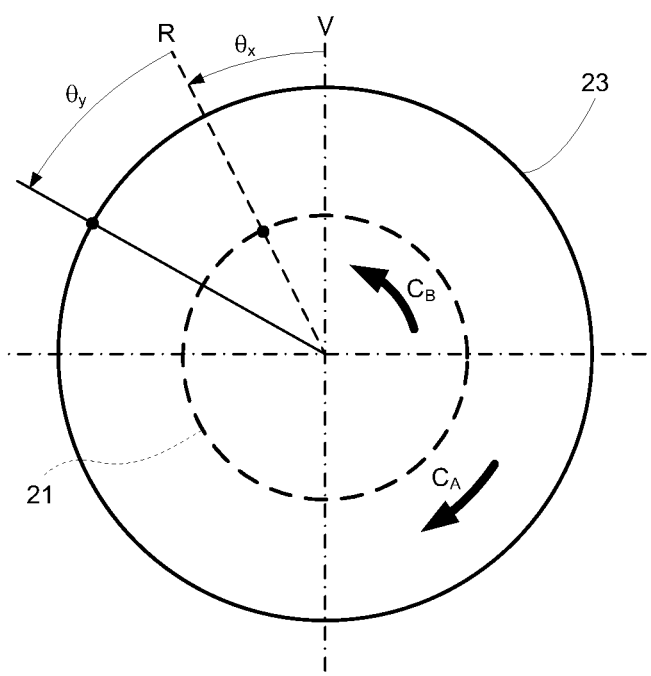
Figure 7:
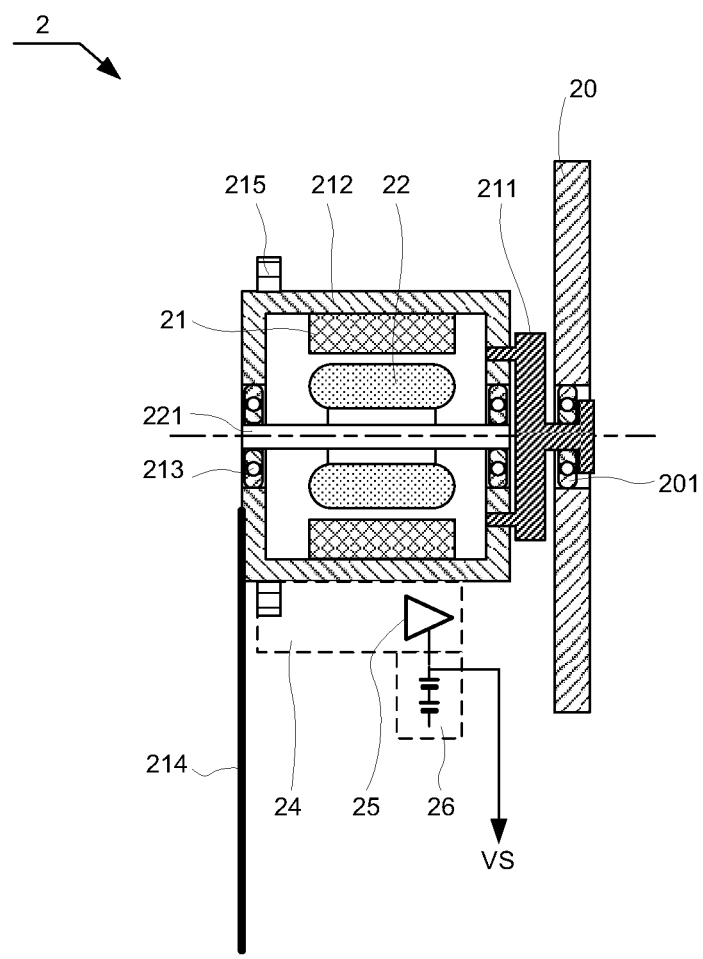
Figure 8:
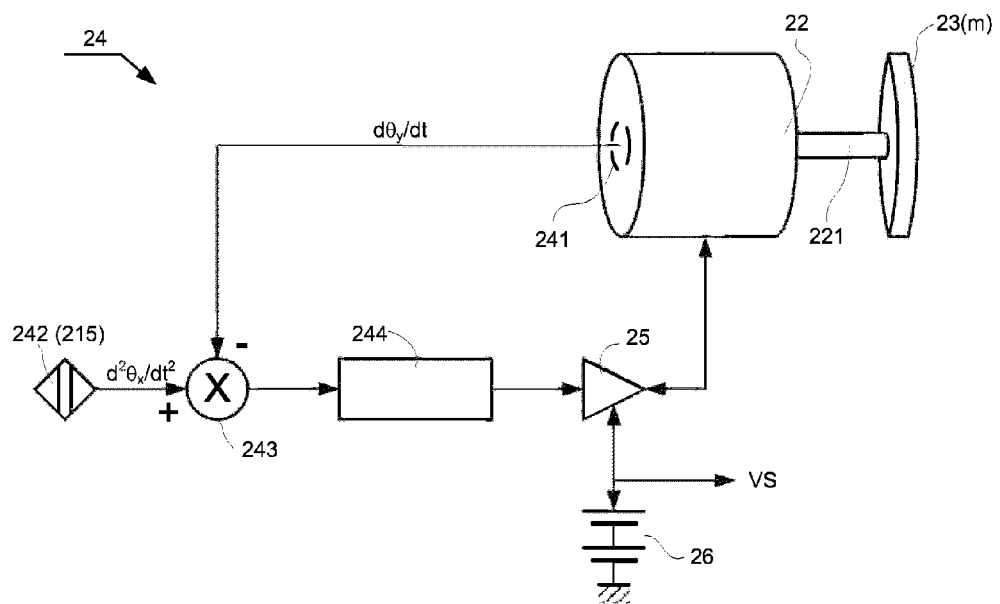
Figure 9:
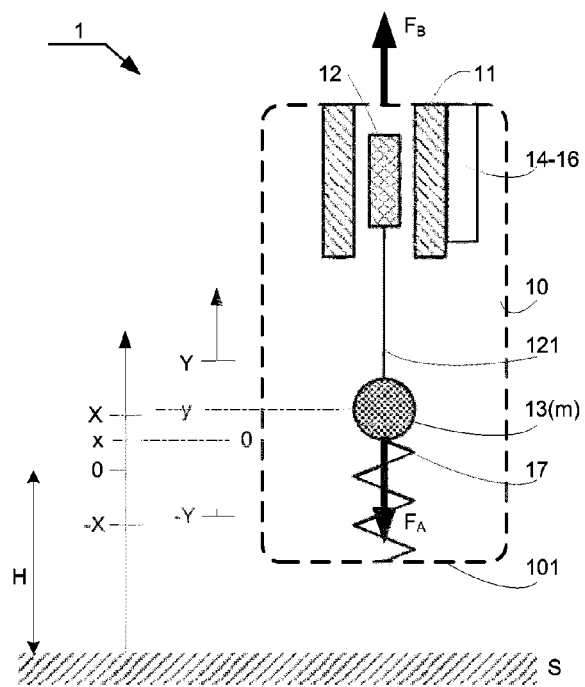
Figure 10:
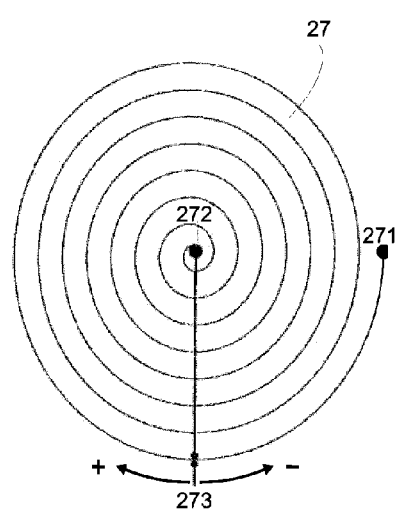

FIG. 3 comprises six graphs relating to the sinusoidal motion positions of a housing and a mass part of the electric power generating device and to the speeds and accelerations thereof as a function of time;

FIG. 4 shows an optimum variation of the mass part speed slaved according to the invention to a sinusoidal acceleration of the housing;

FIGS. 5 and 6 are perspective and front schematic views of a rotating actuator in an electric power generating device according to a second embodiment of the invention;

FIG. 7 is an axial sectional view of the electric power generating device according to the second embodiment;

FIG. 8 is a block diagram of a rotation speed servo-control system of the inductor of the rotating actuator according to the second embodiment;

FIG. 9 is similar to FIG. 1, but with a compression spring according to an alternative of the first embodiment; and FIG. 10 shows a spiral spring for an alternative second embodiment.

Figure 2:
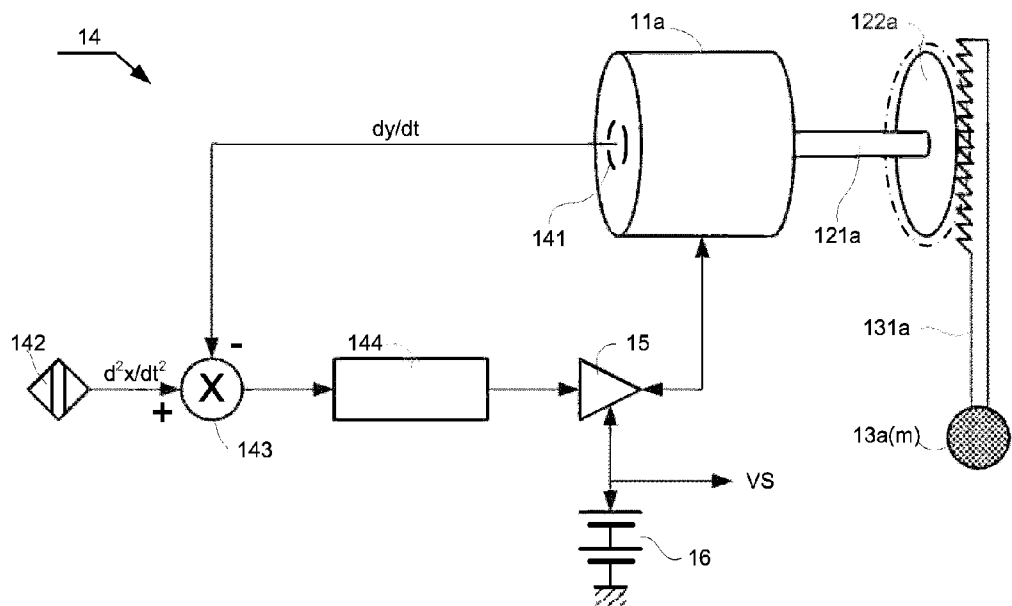
FIG. 2 is a block diagram of a rotation speed servo-control system for the inductor of a rotating actuator according to an alternative of the first embodiment.

With reference to FIGS. 1 and 2, a mechatronical electric power generating device 1 according to the first embodiment of the invention includes a housing 10 that encloses an electromagnetic actuator 11-12, a mobile mass part 13 and an electric circuit 14-16. The main components of the electric circuit are an electronic servo control system 14 controlling the actuator, a reversible amplifier-undulator 15 and a miniature electric power storing device 16, such as an accumulator or a super-capacitor.

The actuator 11-12 is reversible. Under the control of the servo control system 14, the actuator operates as an electric motor when it is supplied by the electric power storing device 16 as a voltage source for converting electric power into mechanical power biasing the mobile mass part 13, or as an electric generator for converting mechanical power resulting from the motion of the mobile mass part into electric power to be stored in the storing device that is able to deliver an output voltage VS.

According to the embodiment illustrated on FIG. 1, the actuator is synchronous linear and comprises two main members: a cylindrical armature 11 with coils fastened inside the housing 10 and a cylindrical inductor 12 with permanent magnets able to slide in a vertical axial translation in the armature. The inductor 12 supports by a lower end the mobile mass part 13 through an axial rod 121.

According to an alternative of the linear actuator, the relative positions of the armature and the inductor can be inverted. The armature is central and fastened to the axial rod 121 and is connected by rubbing brushes to the amplifier-undulator 15. The inductor is peripheral and surrounds the armature.

According to an alternative shown on FIG. 2, the actuator is a DC rotating machine including a cylindrical stator armature 11a with permanent magnets and a coil cylindrical rotor inductor 12a rotatably mounted in the armature 11a. An example of the actuator 11a-12a will be described further in detail with reference to FIGS. 7 and 8. The mass part 13a in this alternative is movable perpendicularly to an axial rod 121a of the inductor 12a by means of a rack 131a having its lower end fastened to the mass part and gearing into a toothed wheel 122a fastened to an end of the axial rod 121a.

The housing 10 is carried by a moving system and is submitted, from the latter, to accelerations according to two opposite directions. According to an example, being referred to subsequently, the moving system is a walker carrying the housing fastened to his waist. The housing 10 is then submitted to oscillatory motions substantially in a vertical plane, generated by the step of the walker and characterized by accelerations according to two opposite directions. According to other examples, the moving system is a boat submitted to oscillatory motions resulting from the rolling and/or pitching under the effect of the swell.

The mass part 13 shown on FIG. 1 is for example all or part of a mobile cellular terminal or a walkman whose battery is at least partially the electric power storing device 16 itself, or any other object such as a key-ring or a purse. The mass part can be removed from the actuator through a fastener on the axial rod 121 of the clip or hook and loop woven tape, or magnet and iron type.

According to an alternative of the embodiment shown on FIG. 1, the housing is upside down and the assembly comprising the housing 10, the actuator 11-12 and the electric circuit 14-16 is hung by the axial rod 121 of the actuator from the walkers waist so that the mass part is made up by at least quite heavy components of the mechatronical device. An additional mass is then useless. In such an alternative, an accelerometer is fastened to the axial rod of the actuator. The speed of the actuator with respect to the axial rod is measured as further described below. A mobile cellular terminal or any other object can also be hung from the housing in order to make it heavier, as previously.

On FIG. 1, the upward turned arrow shows the holding strength $F_B$ exerted by the waist on the housing 10. The downward oriented arrow shows the action $F_A$ of the mass part exerted on the axial rod 121 of the actuator. The position of the housing 10 with respect to a reference system linked to the ground S and having an origin O at height H from the ground, and the motion amplitude of the housing are denoted by x and X. The position of the mass part 13 with respect to a reference system linked to the housing and the motion amplitude of the mass part in the housing are denoted by y and Y. The housing with all its components has a mass M and the mobile mass part has a mass m.

According to the invention, the actuator 11-12 is slaved so as to automatically draw much more power than with a prior art passive generator. When the actuator operates as an electric generator, the housing 10 is for example accelerated upwards and the coordinate x increases, and the mass part 13 tends to stay stationary as a result of its inertia and the coordinate y decreases. The generator then supplies an electric power able to be stored in the device 16.

The forces $F_A$ and $F_B$ are given by the following equations:

$$F_A = mg + (md^2x/dt^2 + md^2y/dt^2) \text{ and}$$

$$F_B = Mg + (M-m)d^2x/dt^2 + (md^2x/dt^2 + md^2y/dt^2),$$

g being the acceleration of the gravity.

The instantaneous power $P_A$ delivered to the actuator by means of the axial rod 121 and the instantaneous power $P_B$ drawn from the walker at the location where the housing is fastened to the walkers waist are expressed by the following products of the "force x speed" type:

$$P_A(t) = -F_A dy/dt \text{ and } P_B(t) = F_B dx/dt.$$

Such powers have the same mean value P omitting any friction in the housing and assuming that all the motions are periodical, requiring that all these derivative products depending on the same variable x or y are, on average, nil. The mean powers of the previous powers then become:

$$P = <P_A> = -m<(d^2x/dt^2)(dy/dt)> \text{ and}$$

$$P = <P_B> = m<(d^2y/dt^2)(dx/dt)>.$$

The first previous equation expresses that the mechanical power supplied to the actuator operating as a generator depends on the vertical acceleration $d^2x/dt^2$ imposed to the housing by the walker and on the vertical speed dy/dt of the mass part with respect to the housing. Knowing that the acceleration $d^2x/dt^2$ imposed to the housing depends on the walker, the invention slaves the speed dy/dt of the mass part on the acceleration of the housing. In order to regulate the speed of the mass part, the electronic servo control system 14 includes a speed sensor 141, an accelerometer 142, a subtracter-multiplier 143, a corrector 144 and the reversible amplifier-undulator 15, as shown on FIG. 2. The speed sensor 141 measures the rotation speed of the inductor 12a, or the translation speed of the inductor 12 integrated into the mass part 13a or 13 and thus senses a magnitude proportional to the vertical speed dy/dt of the mass part. For example, the speed sensor senses the motion speed of the inductor as a function of the voltage induced in a winding thereof or the voltage across the actuator through the Hall effect, or by an electro-optic cell. The accelerometer 142 is fastened to the housing 10 and measures the substantially vertical acceleration $d^2x/dt^2$ of the housing.

According to a relationship between the acceleration of the housing and the speed of the mass part in accordance with this invention, the subtracter-multiplier 143 provides a parameter depending on the measured acceleration of the housing and the measured motion speed of the mass part. The subtracter-multiplier obtains this parameter by multiplying the measured acceleration by a predetermined factor depending particularly on the amplitudes of the acceleration and the speed and subtracts the resulting product at the magnitude proportional to the measured vertical speed dy/dt. The corrector 144 corrects the difference delivered by the subtracter-multiplier with respect to a set point value depending on the position of the housing to apply an input voltage to the amplifier-undulator 15 as a function of the corrected difference. According to the input voltage as a function of the corrected difference, the amplifier-undulator is reversible for adapting the variations of the electric power, either to be recovered from the actuator or be supplied to the actuator, to direct current and voltage across the storing device 16. The amplifier-undulator is connected to the power storing device 16 and to the actuator 11-12 for imposing a current and a voltage to the actuator so that the latter operates as an electric motor with the electrical power storing device 16 used as a voltage source, or even as an electric generator for electric power charging the storing device 16.

At rest, the mass part 13a or 13 is brought down on the bottom of the housing, and is only brought up again at half-stroke of the rack 131a, or of the axial rod 121, when the accelerometer senses a motion of the housing. Alternatively, the mass part is permanently balanced by a compression spring fastened between the lower part of the housing and the rack 131a, or the axial rod 121, or by an attraction spring fastened between the upper part of the housing and the rack 131a, or the axial rod 121.

For example, it is assumed that the actuator operating as a motor imposes a substantially sinusoidal motion to the mass part in the housing and the housing moves vertically in a substantially sinusoidal way with respect to the ground S, i.e.:

$$x = X\sin(2\pi ft), \text{ and}$$

$$y = Y\sin(2\pi ft + \phi),$$

wherein f is the frequency of the substantially sinusoidal motions and $\phi$ the phase shift therebetween that is equal to $-\pi/2$ for maximizing the mean power P. For $P = \langle P_A \rangle$, this leads to the speed of the mass part being slaved with respect to the housing on acceleration of the housing with respect to the ground. This is easier to implement that slaving the acceleration of the mass part with respect to the housing to the speed of the housing with respect to the ground according to $P = \langle P_B \rangle$.

With such hypotheses, the dependency relationship of the speed of the mass part with respect to the acceleration of the housing is as follows:

$$dy/dt = -(Y/2 \, \pi f X)(d^2 x/dt^2).$$

The parameters f and X can be derived from the measured acceleration $d^2 x/dt^2$ of the housing. The deflection 2Y of the mass part is limited while considering that the larger the deflection, the larger the power to be recovered.

FIG. 3 shows the evolution of coordinates x and y and their speeds and accelerations as a function of the time t, when the linear motions of the housing and the mass part are assumed to be substantially sinusoidal in time with a period $T=1/f$, as previously. The position x of the housing with respect to the ground S is imposed by the walker's motions. The speed dx/dt and the acceleration $d^2 x/dt^2$ of the housing are also imposed by the walker, i.e.:

$$dx/dt = 2\pi f X \cos(2\pi ft),$$

$$d^2 x/dt^2 = -4\pi^2 f^2 X \sin(2\pi ft).$$

The speed of the mass part with respect to the housing:

$$dy/dt = 2\pi f Y \cos(2\pi ft + \phi) = 2\pi f Y \sin(2\pi ft)$$

is slaved to the acceleration $d^2 x/dt^2$ of the housing according to the relationship $dy/dt = -(d^2 x/dt^2)(Y/2 \, \pi f X)$. The position y of the mass part in the housing and its acceleration $d^2 y/dt^2$ result therefrom. At times 0 and T/2, the speed dx/dt of the housing is maximum and although low, the acceleration $d^2 y/dt^2$ of the mass part is then maximum, with the same sign as the speed of the housing: the device 1 thus has available a significant force $F_B$ and thus a significant power $P_B$ at the level of the waist. The drawn power is not instantaneously transmitted to the axial rod 121, 121a of the actuator: part of the drawn power is first converted into kinetic power.

For example according to FIG. 3, the servo control system slaving the motion speed of the mass part to the acceleration of the housing has a cycle having four operating phases of the electromagnetic actuator 11-12 that correspond substantially to four quarters of a period and that have somewhat equal durations, as the mean power $\langle P_A \rangle$ is not nil and depends on the product $\sin(2\pi ft) \cos(2\pi ft + \phi)$ during a period. At the beginning of a half-period T/2, the actuator first operates as a motor substantially between times 0 and T/4 for bringing up the mass part 13 with an increasing speed substantially up to the centre of the stroke thereof, as long as the downward oriented acceleration of the housing according to the descent, i.e. according to the opposite direction to the rise of the mass part, increases; the electric power consumed by the actuator is converted into kinetic power for decreasing the acceleration of the mass part. Then substantially between times T/4 and T/2, the actuator operates as an electric generator for more and more decreasing the speed of the mass part according to the upward direction during a decrease of the acceleration of the housing according to the downward direction so as to recover the kinetic power converted into electric power through stronger and stronger braking of the mass part ending going up. At the beginning of the next half-period, substantially between times T/2 and 3T/4, the mass part goes down and the actuator operates as a motor for increasing the speed of the mass part according to the downward direction, during an increase of the acceleration of the housing according to the upward direction. Finally, substantially between times 3T/4 and T, a deceleration is again present of the mass part through stronger and stronger braking of the latter, ending going up exerted by the actuator operating as a generator and therefore a decrease of the speed of the mass part according to the downward direction during a decrease of the acceleration of the housing according to the upward direction.

The automatic drawing of power occurs through moving the mechatronical device, without mechanical contact with a fixed reference such as the ground. This justifies using an inertia as a mobile mass part in a housing tends to remain stationary with respect to the ground when the housing is for example hung on the waist of a walker. The relative motion of the mass part with respect to the housing allows the actuator to be controlled on the condition that power is sufficiently drawn.

As shown above, the recovered power is maximized while imposing to the axis of the actuator a speed in direct relationship with the acceleration of the housing. Thanks to the servo control system, these two magnitudes are maintained in phase. According to the aimed objective such as a minimization of the generated discomfort and/or a maximization of the recovered power and/or an embodiment simplicity, the variation imposed to the speed of the mass part by the servo control system can be substantially sinusoidal, as in the previous example, or substantially trapezoidal, or of the same type as the acceleration of the housing.

The amplitude of the speed is determined so as to regulate the deflection 2Y of the mass part in the housing. If the force $F_A$ is limited at the level of the axis of the actuator, the force $F_B$ is also, by reaction, limited at the level of the fastener of the housing to the waist. If the speed of the housing is low, then the mechanical power transmitted to the housing by its fastener is highly reduced. In other words, for increasing the mechanical power drawn by the housing, and thus the electric power being drawn, this invention contemplates to accelerate, then to brake the mass part without any means, such as the mass part hanging on a spring, so as to recover the electric power.

A large deflection 2Y of the mass part enhances the recovery of power, including from slow motions of the housing. A light mass part to be carried by the walker is compatible with a significant drawn power, on the condition that strong accelerations are imposed to the mass part, resulting in a large deflection 2Y, which is to be adapted to the dimensions of the housing.

As set forth above, the vertical motion of the mass part in the housing can be other than sinusoidal. In particular for optimizing the energetic evaluation, this invention contemplates making the most profit of the maximum of the acceleration of the housing substantially at times T/4 and 3T/2 of a period T so that the actuator 11-12 operates as a motor and imparts a very high speed to the mass part 13, as the mean power $\langle P_A \rangle$ supplied to the actuator is proportional to the product of the acceleration $d^2 x/dt^2$ of the housing and of the speed dy/dt of the mass part that is slaved to the acceleration.

The mass part is then slowed down by the actuator operating as an electric generator when the acceleration of the housing is lower substantially around times 0 and T/2.

FIG. 4 illustrates such an optimization with a speed dy/dt of the mass part suddenly increasing around times T/4 and 3T/2 of a period T, according to a substantial trapezoidal variation for a duration ΔT lower than the period T. The optimization is achieved through the servo control system 14 that imposes through the corrector 144 current set points generating speed "pulses" of the mobile mass part always of the same amplitude Y and the same duration ΔT corresponding to the maximum deflection of the mass part and being synchronized with a maximum acceleration of the housing. More precisely, the actuator 11-12 has a two phase operating cycle corresponding to two half-periods. The actuator suddenly operates as a motor just at the beginning of the speed pulses of duration ΔT substantially between times (T/4−ΔT/2) and T/4 and between (3T/4−ΔT/2) and 3T/4 for suddenly increasing the motion speed of the mass part according to the upward direction and the downward direction to its maximum during an increase in absolute value of the acceleration of the housing. The speed of the mass part in the housing can then reach the speed $(dy/dt)_{max}=2Y/\Delta T$. Substantially between times (T/4+ΔT/2) and (3T/4−ΔT/2), the actuator suddenly operates as a generator to decrease the motion speed of the mass part according to the upward direction and the downward direction towards zero during a decrease in absolute value of the acceleration of the housing. Between the speed pulses ΔT, the actuator does not operate and the mass part is maintained at rest at y=0.

Assuming that the duration ΔT is quite lower than the period T, the mean power then becomes:

$P=<P_A>=(2\Delta T/T)m(d^2x/dt^2)_{max}(dy/dt)_{max}$, i.e.

$P=(2\Delta T/T)m(4\pi^2 f^2 X)(2Y/\Delta T)$, or:

$P=16\pi^2 mf^3 XY.$

For example, assuming that the mass part weighs 0.2 kg and is slaved with a deflection amplitude of Y=4 cm and the actuator carried at the walker's waist is submitted to oscillations of amplitude X=6 cm and frequency f=2 Hz, the power to be recovered is of the order of P=0.605 W if the optimization with speed peaks of the mobile mass part is implemented according to FIG. 4.

Without such an optimization, the power to be recovered is:

$<P_A>=-m<(d^2x/dt^2)(dy/dt)>$, i.e.

$P=-m4\pi^2 f^2 X 2\pi f Y(\sin(-\pi/2)/2=4\pi^3 mf^3 XY;$ $P=0.475$ W.

The optimization allows a factor of 4/π to be gained with respect to the embodiment with a mere speed servo control system.

More generally, the speed dy/dt of the mass part can increase and decrease around times T/4 and 3T/2 dissymmetrically.

The first embodiment of the invention as described above with the alternatives thereof is sufficient for supplying with an output voltage VS a small electric item, for example such as a mobile cellular terminal, a cardio-tachymeter, or a GPS localization device carried by an animal.

In order to save the electric power likely to be consumed by the storing device 16, a switch can be arranged at the output thereof so as not to supply the actuator 11-12 and the servo control system 14 as long as the accelerometer 142 does not detect any motion of the housing for a predetermined period. According to another alternative, a clock is included into the mechatronical device 1 and is used at the expiry of each predetermined period to wake the mechatronical device 1 so that the speed sensor 141 optionally detects a motion of the mass part, or so that the accelerometer 142 optionally detects a motion of the housing.

In order to save even more electric power in the mechanical/electric conversion and the electric storage, but to the detriment of a decrease of the drawn electric power, the servo control system 14 no longer controls the actuator 11-12 as a motor during the parts of the operating cycle of the actuator ranging substantially between times 0 and T/4 and substantially between times T/2 and 3T/4 with reference to FIG. 3. During those portions of the cycle, the mass part 12-13 moves freely. The servo control system 14 only operates to control the actuator as a generator for charging the electric power storing device 16 during the other parts of the operating cycle of the actuator ranging substantially between times T/4 and T/2 and substantially between times 3T/4 and T.

The previous explanations are also valid if a natural oscillatory motion is considered according to another direction, for example pitching or rolling for a boat. The mass part is then submitted to the natural oscillation, but the effect of the weight thereof can be such as to be cancelled at the horizontal, for example, removing the need of balancing at rest. The assembly of the device can be of the pendulum type.

Referring now to FIGS. 5 and 6, a mechatronical electric power generating device 2 according to the second embodiment of the invention comprises a housing and a mass part 23 able to be driven with rotation motions, instead of the linear motions of the housing 10 and the mass part 13 according to the first embodiment of the invention. The mass part 23 can comprise an inertia wheel that are fastened to one end of an axial rod 221 of a rotor inductor 22 able to rotate in a stator armature 21 of a reversible rotating actuator 21-22. Alternatively, the inertia wheel is replaced by two counterweights that are fastened or able to freely slide symmetrically on a diametrical rod fastened to an end of the axial rod 221, or that can slide symmetrically on the diametrical rod in a slaved way through the servo control system 24, or that are arranged at the ends of two opposite apexes of a deformable quadrilateral having another apex fastened to the end of the axial rod and having its deformation slaved by means of the servo control system 24. The alternatives with movable counterweights on the diametrical rod or with the deformable quadrilateral allow the inertia moment of the mass part to be adjusted as a function of the slaved phases of the operating cycle of the actuator. A plunger system can also move an incompressible fluid for adjusting the inertia moment of the mass part with respect to the rotation axis.

The deflection $2\theta_Y$ of the mass part 23 is now angular and is no longer limited by the vertical dimension of the housing.

FIG. 7 further shows in details the second embodiment of the mechatronical device according to the invention including a reversible rotating electromagnetic actuator, for example with four poles, in the form of a more conventional magnet synchronous rotating machine than a linear actuator.

The mechatronical device 2 includes a housing 20 containing the actuator 21-22, the mobile mass part essentially made up by the cylindrical rotor inductor 22 of the actuator, and an electric circuit 24-26. If the inertia of the rotor inductor is insufficient, the mass part can be completed by a small wheel integral with the axial rod 221 of the rotor inductor, such as the inertia wheel 23 shown on FIG. 5. In FIG. 7, the housing 20 is partially shown in the form of a vertical support that is, for example, fastened under the waist or to the leg of a walker. The housing 20 is rotationally arranged through a ball bearing 201 around a fulcrum 211 fastened to an end of a mild steel cylindrical barrel 212. A cylindrical stator armature 21 of the actuator is fastened to the internal surface of the cylindrical barrel 212, the ends of which are closed and rotatably mounted about the axial rod 221 of the rotor inductor 22 by means of two ball bearings 213. The external surface of the cylindrical barrel 212 supports the servo control system 24, the reversible amplifier-undulator 25 and the miniature electric power storing device 26. The stator armature 21 is driven with a relatively slow rotation motion with respect to the quick rotation motion of the rotor inductor 22.

One end of the cylindrical armature 21 supports the fulcrum 211 rotatably uncoupled from the housing 20 by the ball bearing 201. The ball bearings 213 rotatably uncouple the rotor armature 22. Such uncouplings improve the comfort of the walker carrying the device 2 by isolating the housing 20 from possible vibrations due to the quick rotation of the rotor inductor, as the stator armature is only biased by slow angular oscillations.

According to an alternative rotating actuator, the relative positions of the armature and the inductor can be inverted. The armature is central and fastened to the axial rod 221 and is connected by rubbing brushes to the amplifier-undulator 25. The inductor is peripheral and fastened to the internal surface of the cylindrical barrel 212.

According to another alternative not shown, to take advantage of the major part of the inertia of the mechatronical device, the inertia wheel is replaced by the masses of some components of the mechatronical device, such as some relatively heavy components of the electric circuit 24-26 such as the storing device 26, and/or by a mobile cellular terminal when the latter is supplied with an output voltage VS by the storing device 26. Such additional masses are fastened to the axial rod 221*a*, 221*b* of the actuator 21*a*-22*a*, 21*b*-22*b* for taking advantage of the overall inertia.

In the second embodiment, at the end of the cylindrical barrel 212 supporting the cylindrical stator armature 21 opposite the electric circuit 24-26, a coupling arm 214 can be fastened so as to be able to be driven with a slow oscillatory motion generated by the walker. An angular acceleration measurement sensor fastened to the cylindrical barrel 212 of the stator armature 21 comprises two miniature accelerometers 215 diametrically opposite with respect to the axial rod 221. The accelerometers 215 are able to measure opposite accelerations according to an acceleration measurement sensitivity direction substantially parallel to the ground when the housing is hung from the leg of the walker.

The electronic servo control system 24 shown on FIG. 8 for controlling the actuator 21-22 is similar to the servo control system 14 according to the first embodiment. The electronic servo control system 24 includes a speed sensor 241 measuring the angular rotation speed of the inductor 21 and the dual accelerometer sensor 242 that are connected to the differential inputs of a control circuit 243-244-25, similarly to the first embodiment shown on FIG. 2. As a function of a relationship relating to the angular acceleration $d^2\theta_x/dt^2$ of the stator armature 21 and the angular speed $d\theta_y/dt$ of the mass part essentially comprising the rotor inductor 22, a corrector 244 in the control circuit collects from a subtracter-multiplier 243 a difference between, on the one hand, the product of the measured angular acceleration by a predetermined factor depending particularly on the amplitudes of the angular acceleration and the angular speed and, on the other hand, a magnitude proportional to the angular speed $d\theta_y/dt$ and compares the resulting difference to a set point value depending on the angular position $\theta_x$ of the housing. The result of the comparison is used for applying an input voltage to the amplifier-undulator 25 connected to the electric power storing device 26 to impose a current and a voltage to the actuator 21-22 so that the latter operates as a motor with the electric power storing device 26 used as a source of voltage, or even as a generator for electrically charging the storing device 16.

For example, the mechatronical device 2 can be carried at the wrist or the thigh of a walker, or be fastened on a boat.

As in the first embodiment, in order to save electric power able to be consumed by the storing device 26, the supply of the electric circuit 24-26 can be manually cut off by a switch so as not to supply the actuator 21-22 and the servo control system 24 as long as the dual accelerometer sensor 242 does not detect any motion of the housing for a predetermined period.

The operating principle of the mechatronical device 2 is essentially similar to that of the mechatronical device 1 according to the first embodiment, making a linear speed correspond to an angular rotation speed and a linear acceleration to an angular rotation acceleration. By means of the mechanical uncoupling of the housing 20 with respect to the stator armature 21 imparted by at least the ball bearing 201, the stator armature is driven by natural motions of the moving system, such as a walker, on which mechanical power is to be recovered. The motion of the system has a rotation component as is the case about the neck of femur of a walker, or at the level of the wrist of the latter or on a boat submitted to rolling and/or pitching. The power recovered by the natural oscillation of the stator armature 21 is maximized by imposing on the rotating mass part made up by the rotor inductor 22 an angular speed in direct relationship with the angular acceleration of the stator armature. However, in the second embodiment, the own angular speed of the rotor inductor 22 is no longer limited by dimension constraints of the housing 20 and can be high compared to the low angular speed of the stator armature 21 from which a maximum of power is to be recovered.

On FIG. 6, the arrow oriented according to the trigonometric direction shows a resistant torque $C_B$ exerted by the body of the walker on the stator armature. The arrow oriented according to the opposite trigonometric direction shows the action $C_A$ of the inertia wheel 23 and the rotor inductor 22 exerted on the axial rod 221 of the actuator. The angular position of the stator armature 21 for example with respect to a vertical V linked to the ground and the angular amplitude of the rotation motion of the stator armature are denoted by $\theta_x$ and $\theta_X$. The angular position of the mass part with respect to a reference system linked to a radius R of the stator armature and the amplitude of the rotation motion of the mass part in the housing are denoted by $\theta_y$ and $\theta_Y$. Device 2 with the housing and all its components has an overall inertia moment J and the total mobile mass part 22-23 comprising particularly the rotor armature 22, the axial rod 221 and optionally the inertia wheel 23 has an inertia moment j.

If the housing is submitted to a rotation motion while the mass part 22-23 is simultaneously rotating, the torques $C_A$ and $C_B$ are given by the following equations:

$$C_A = j d^2\theta_x/dt^2 + j d^2\theta_y/dt^2$$

$$C_B = (J-j) d^2\theta_x/dt^2 + C_A = J d^2\theta_x/dt^2 + j d^2\theta_y/dt^2.$$

The instantaneous power $P_A$ delivered to the actuator 21-22 by means of the axial rod 221 and the instantaneous power $P_B$ drawn from the walker at the hooking point for the housing to the walker's leg are expressed by the following products of the "torque×angular speed" type:

$$P_A(t) - C_A d\theta_y/dt \text{ et } P_B(t) - C_B d\theta_x/dt.$$

Such powers have the same mean value P omitting any friction in the housing and assuming that all the rotations are periodical, imposing that all these derivative products depending on the same variable $\theta_x$ or $\theta_y$ are nil on average. The mean powers of the previous powers then become:

$$P=<P_A>=-j<(d^2\theta_x/dt^2)(d\theta_y/dt)> \text{ and}$$

$$P=<P_B>=j<(d^2\theta_y/dt^2)(d\theta_x/dt)>.$$

The first previous relationship expresses that the mechanical power supplied to the actuator operating as a generator depends on the angular acceleration $d^2\theta_x/dt^2$ imposed to the stator armature by the walker and on the angular speed $d\theta_y/dt$ of the mass part with respect to the stator armature. Knowing that the acceleration $d^2\theta_x/dt^2$ imposed to the stator armature depends on the walker, this invention slaves the speed $d\theta_y/dt$ of the mass part on the acceleration of the stator armature. For a low variation of the angular acceleration of the stator armature, the higher the speed of the rotor inductor and thus of the mass part, the higher the amount of power being recovered. The regulation of the angular speed of the mass part on the angular acceleration of the stator armature is provided by the electronic servo control system 24 shown on FIG. 8, as has been described with reference to FIG. 2.

For example, it is assumed that the actuator 21-22 operating as a motor imposes a substantially sinusoidal rotation as a function of the time to the mass part 22-23 in the stator armature and the stator armature moves alternatively according to a rotation substantially sinusoidal with respect to the ground, i.e.:

$$\theta_x=\theta_X\sin(2\pi ft),$$

$$\theta_y=\theta_Y\sin(2\pi ft+\phi)$$

wherein f is the frequency of substantially sinusoidal motions and y the phase shift therebetween that is equal to $-\pi/2$ for maximizing the mean power P. For $P=<P_A>$, this causes the angular speed of the mass part with respect to the stator armature to be slaved to the angular acceleration of the latter, which is easier to implement that slaving the angular acceleration of the mass part to the angular speed of the stator armature according to $P=<P_B>$.

With these hypotheses, the dependency relationship of the angular speed of the mass part $$d\theta_y/dt=2\pi f\theta_Y\cos(2\pi ft-\pi/2)=2\pi ft\theta_Y\sin(2\pi ft)$$

with respect to the angular acceleration of the stator armature $$d^2\theta_x/dt^2=°-4\pi^2f^2\theta_X\sin(2\pi ft)$$

that can be measured by the two accelerometers 215 sufficiently spaced apart from the sensor 242, is as follows:

$$d\theta_y/dt=-(\theta_Y/2\pi f\theta_X)(d^2\theta_x/dt^2).$$

The parameters f and $\theta_x$ can be derived from the measured acceleration $d^2\theta_x/dt^2$ of the stator armature. The amplitude $\theta_Y$ of the mass part is no longer limited by the dimensions of the housing.

The mean power then becomes:

$$P=<P_A>=-j<(d^2\theta_x/dt^2)(d\theta_y/dt)>=<P_B>, \text{ i.e.}$$

$$P=-j(-4\pi^2f^2\theta_X)(2\pi f\theta_Y)/2=4\pi^3jf^3\theta_X\theta_Y.$$

FIG. 3 also shows the evolution of the angular positions $\theta_x$ and $\theta_y$ and their speeds and accelerations as a function of the time t, when the rotations of the stator armature and the mass part are assumed to be substantially sinusoidal in time with a period T=1/f. The angular position $\theta_x$ of the stator armature with respect to the vertical V is imposed by the walker's motions. The speed $d\theta_x/dt$ and the acceleration $d^2\theta_x/dt^2$ of the stator armature are also imposed by the walker, i.e.:

$$d\theta_x/dt=2\pi f\theta_x\cos(2\pi ft),$$

$$d^2\theta_x/dt^2=-4\pi^2f^2\theta_x\sin(2\pi ft).$$

The angular speed of the mass part with respect to the stator armature $$d\theta_y/dt=2\pi f\theta_Y\cos(2\pi ft+\phi)=2\pi f\theta_Y\sin(2\pi ft)$$

is slaved to the angular acceleration $d^2\theta_x/dt^2$ of the stator armature according to the relationship: $d\theta_y/dt=-(\theta_y/2\pi f\theta_x)(d^2\theta_x/dt^2)$. The angular position $\theta_y$ of the mass part in the housing and its acceleration $d^2\theta_y/dt^2$ result therefrom. At times 0 and T/2, the angular speed $d\theta_x/dt$ of the stator armature is maximum and although low, the angular acceleration $d^2\theta_y/dt^2$ of the mass part is then maximum, having the same sign as the speed of the stator armature; device 2 thus has available a high torque $C_B$ and this a significant power $P_B$ at the level of the leg. The drawn power is not instantaneously transmitted to the axial rod 221 of the actuator: part of the drawn power is first converted into kinetic power.

For example, according to FIG. 3, during a half-period T/2, the actuator 21-22 operates as a motor substantially between times 0 and T/4 to rotate the mass part 22-23 according to the trigonometric direction with an angular speed substantially increasing up to radius R as long as the angular acceleration of the stator armature increases according to the opposite trigonometric direction; the electric power consumed by the actuator is converted into kinetic power to decrease the acceleration of the mass part. Then substantially between times T/4 and T/2, the actuator operates as an electric generator so as to recover the kinetic power by slowing down the mass part whose angular speed according to the trigonometric direction decreases while the angular acceleration of the stator armature decreases according to the opposite trigonometric direction. During the next half-period substantially between times T/2 and T, the mass part rotates according to the opposite trigonometric direction, and an increase of the angular speed of the mass part by the actuator operating as a motor is again present during an increase of the angular acceleration according to the trigonometric direction, then a decrease of the angular speed of the mass part through slowing down by the actuator during a decrease of the angular acceleration of the stator armature according to the trigonometric direction.

Thus, during each walker's step, the actuator 21-22 operates in both rotation directions: the actuator on the one hand accelerates its motion and thus consumes electric power and on the other hand recovers electric power and thus slows down its motion. The motion of the actuator is synchronized to that of the walker so that the latter feels a resistance, an evidence of some mechanical power being recovered from the motions of the walker, converted by the actuator and transmitted to the electric power storing device 26 by means of the electric circuit. Such power is not transmitted instantaneously to the storing device as the mass part 22-23 temporarily stores power. Converting the motions and the resolution thereof into equations as described above shows that the electric power, or the mechanical power at the level of the actuator, oscillates between two extreme values, able to be much higher in absolute value than its mean value, the latter ensuring that the storing device is recharged.

Qualitatively, the actuator 21-22 abruptly accelerates and slows down the mass part 22-23 as the walkers motions are relatively long, that is that the rotation of the leg at the level of the hip has a slow angular speed and because it is required that the walker feels a significant effort for gaining a sufficient power.

As already indicated, the recovered power is all the higher as the angular speed of the mass part is high and thus, the variation of the angular speed is low. An alternative of the operation of the actuator according to the invention then comprises driving into rotation the mass part 22-23 at a high nominal angular speed, practically much higher than the maximum angular speed of the stator armature, and varying the angular speed $d\theta_y/dt$ of the mass part around this nominal angular speed. This alternative has the advantage of operating the electric circuit 24-26 with a high mean voltage higher than that of the storing device 26 for example, and of having permanently a high inertial coupling between the mass part and the walker.

Alternatively, the servo control system can be such that the maximum angular speed of the mass part is reached in several walkers steps, instead of one single step.

The motion of the mass part 22-23 in the housing 20 can be other than sinusoidal. In particular for optimizing the energetic evaluation, this invention contemplates making the most profit of the maximum of the acceleration of the stator armature substantially at the times T/4 and 3T/2 of a period T so that the actuator operates as a motor and suddenly imparts a very high speed to the mass part, as the mean power <PA> supplied to the actuator 21-22 is proportional to the product of the acceleration $d^2\theta_x/dt^2$ of the stator armature and the speed $d\theta_y/dt$ of the mass part that is slaved on the acceleration. The mass part is then slowed down by the actuator operating as an electric generator when the acceleration of the stator armature decreases in absolute value.

However, in the second embodiment, there is no longer any constraint concerning the deflection of the mass part in motion in the housing. Consequently, the time interval ΔT is no longer limited this way and can optionally reach the half-period T/2 for taking profit of the lowest accelerations of the stator armature.

FIG. 4 also illustrates an example of optimization with an angular speed $d\theta_y/dt$ of the mass part suddenly increasing around times T/4 and 3T/2 of a period T, according to a substantial trapezoidal variation with a symmetric increase and decrease for a duration ΔT lower than the period T. The optimization is achieved with the servo control system 24 that submits through the corrector 244 current set points generating speed "pulses" of the mobile mass part always of the same amplitude Y and the same duration ΔT corresponding to the maximum deflection of the mass part and synchronized with a maximum acceleration of the housing.

Assuming that the duration ΔT is substantially equal to the half period T/2, the mean power then becomes:

$$P=<P_A>=(2/\pi)j(d^2\theta_x/dt^2)_{max}(d\theta_y/dt)_{max}, \text{ i.e.}$$

$$P=(2/\pi)j(4\pi^2f^2\theta_X)(d\theta_y/dt)_{max}, \text{ i.e.:}$$

$$P=8\pi j f^2\theta_X(d\theta_y/dt)_{max}.$$

For example, for the same mass part of m=0.2 kg as in the example of the first embodiment, but in the form of a rather compact hollow cylindrical barrel such as a ring with a radius r=4 cm, that is an inertia moment of the mass part $j=mr^2=0.00032$ kg m², and having a maximum angular speed $(d\theta_y/dt)_{max}$ of 10,000 rpm, that is 1047 rd/s, and for the actuator 21-22 carried at the walkers waist submitted to oscillations with an amplitude $\theta_X=0.35$ rd and a frequency f=1 Hz, the maximum power able to be recovered is 3 W if the speed of the mass part is slaved to the acceleration of the sinusoidal shaped stator armature.

Without such an optimization with speed peaks of the mobile mass part, it is preferable for technological reasons to limit the angular rotation speed of the mobile mass part to a maximum $(\theta_y/dt)_{max}$ as the amplitude $\theta_y$ of the mass part 22-23 is no longer limited by the dimensions of the housing 20. The amplitude $\theta_y$ thus depends on the maximum speed, that is $\theta_Y=(\frac{1}{2}\pi f)(d\theta_y/dt)_{max}$. The power to be recovered is then:

$$P=4\pi^3jf^3\theta_X\theta_Y=4\pi^3jf^3\theta_X((d\theta_y/dt)_{max}/2\pi f),$$

$$P=2\pi^2jf^2\theta_X(d\theta_y/dt)_{max},$$

that is P=2.3 W.

The optimization allows a factor of 4/π to be gained with respect to the embodiment with a mere speed servo control.

Alternatively, the variation of the angular speed of the mass part is dissymmetric about the times T/4 and 3T/2.

According to still other alternatives, the servo control system can be such that the operating cycle of the rotating actuator extends on several walker's steps, particularly in a dissymmetrical way with a number of steps to reach a maximum angular speed of the mass part differing from a number of steps for reaching a minimum angular speed of the mass part.

According to another example, the mass part 23 having a mass m is in the form of a rotating disc with a radius r. The total kinetic power of the rotor armature with an inertia moment $j=mr^2/2$ and an angular speed $(d\theta_y/dt)$ is:

$$E=j(d\theta_y/dt)^2/2.$$

A variation of the angular speed results in a variation of power through interaction with the slow drive motion of stator armature to draw power and an opposite variation for returning it to the storing device 26:

$$P=dE/dt=j(d\theta_y/dt)(d^2\theta_y/dt^2).$$

Thus, for a low angular speed variation, the power to be recovered is all the higher as the angular speed of the mass part is high.

The power variation between two angular speeds of the rotating disc is defined between two power states independently from the path between the states by:

$$\Delta E=j((d\theta_y/dt)_1^2-(d\theta_y/dt)_2^2)/2.$$

An alternative of the operation of the actuator according to the invention then comprises driving into rotation the mass part 22-23 at a high nominal angular speed and varying the angular speed $de\theta_y/dt$ of the mass part around such a nominal angular speed. Such an alternative has the advantage of operating the electric circuit 24-26 with a high mean voltage higher than that of the storing device 26 for example, and of having permanently a high inertial coupling between the mass part and the actuator.

For example, the inertia obtained by a rotating disc having a mass m=0.05 kg and a radius r=0.03 m when the angular speed thereof varies between $(d\theta_y/dt)_1$=8000 rpm and $(d\theta_y/dt)_2$=6000 rpm is ΔE=3.3 J. The duration of the acceleration/slow down motion of a leg being approximately one second, the mean mechanical power E/T, exclusive for losses is then P=3.5 W.

The limits of the power to be drawn are also dependent on the user-walker's comfort. The reaction force should not be too high and punctual on the leg, nor too an important gyroscopic force to be overcome. Practically, two mechatronical devices according to the invention are symmetrically positioned on the sides of the body. The power to be recovered is then of the order of the watt, becoming sufficient for recharging at least partially a mobile cellular terminal.

Contrary to the optimization and in order to avoid a consumption of electric power by the electric power storing device 26 and to simplify the servo control system, the servo control system 24 no longer controls the actuator 21-22 as a motor during the parts of the operating cycle of the actuator ranging substantially between times 0 and T/4 and substantially between times T/2 and 3T/4 with reference to FIG. 3. During those parts of the cycle, the mass part 22-23 moves freely. The servo control system 24 only operates for controlling the actuator as a generator for loading the electric power storing device 26 during the other parts of the operating cycle of the actuator ranging substantially between times T/4 and T/2 and substantially between times 3T/4 and T.

According to alternatives of the first and second embodiments of the invention, a resilient means such as a spring is introduced between the housing and the mass part for assisting the actuator particularly to accelerate the mass part when the actuator operates as a motor.

As shown on FIG. 9 for the first embodiment, a compression helical spring 17 has ends linked to the bottom 101 of the housing 10 and to the mass part 13. When the mass part 13 is for example deep down (y<0) to the bottom of the housing 101, the mass part is to be accelerated more or less thoroughly to the top, as has been shown in the quarter period 0 to T/4 on FIG. 3. The spring 17 being compressed when the mass part is downward slackens for pushing the mass part upward against gravity until the mass part reaches a maximum speed before being slowed down. Alternatively, another compression helical spring has ends linked to the upper part of the housing 10 and to the mass part 13.

For the second embodiment, the resilient means comprises a spiral spring 27 whose peripheral end 271 is fastened to the housing 20 and whose central end 272 is fastened around the axial rod 221 of the rotor inductor 22, as shown on FIG. 10. When it is contemplated that the rotor inductor performs a large number of rounds in both directions, a demultiplication is introduced between the spring and the actuator. A stiffness adjusting means 273 with a radial cursor on the last spire allows the stiffness of the spring 27 to be more or less adjusted depending on the walker.

The spring considerably reduces the weight and the bulk of the actuator on the condition that the frequency of the motions imposed to the stator armature does not deviate too much from the own oscillation frequency of the mass part and spring assembly. For some applications, means such as the cursor 273 for adjusting the stiffness of the spring is used for matching those frequencies as much as possible.

According to alternatives, the spiral spring is completed by a spiral spring arranged in torsion opposition around the axial rod 221, or is replaced by a compression helical spring or two compression helical springs with opposed axial torsions arranged around one end of the axial rod 221.

The servo control system can also relate to the stiffness of the resilient means such as one or two springs.

By way of an example, for the following magnitudes:
resistivity of copper of the windings of the rotor inductor: $\rho=1.8\ 10^{-8}\ \Omega m$;
mean radius of the rotor inductor: 4 cm;
magnetic induction in the actuator: 1.5 T;
electric power 2.3 W to be recovered for the angular motion of the
stator armature around f=1 Hz;
loss in copper: about 0.23 W;
drive torque: 0.44 mN with a spring instead of 2.3 mN without a spring,
in the range of 0.9 Hz to 1.1 Hz;
2.1 cm$^3$ and about 20 g copper are obtained for an embodiment with a spring instead of 57.5 cm$^3$ and 550 g copper for an embodiment with no spring. At equal power to be recovered, the embodiment with a spring is much more economical and can be further miniaturized.

The invention claimed is:

1. A method of electric power generating by an actuator electrically connected to an electric power storing device and comprising a first member able to be submitted to an oscillatory speed motion and a second member making up at least partially a mass part able to oscillate in speed with respect to the first member, said method including servo-controlling the motion of the mass part to the oscillatory motion of the first member to control the actuator as a generator charging the storing device during a part of an operating cycle of the actuator, the mass part freely moving during another part of the operating cycle of the actuator, said method further comprising operating the actuator as a motor for increasing the motion speed of the mass part according to a predetermined direction during an increase of the acceleration of the first member according to a direction opposite to the predetermined direction.

2. A method of electric power generating by an actuator electrically connected to an electric power storing device and comprising a first member able to be submitted to an oscillatory speed motion and a second member making up at least partially a mass part able to oscillate in speed with respect to the first member, said method including:
servo-controlling the motion of the mass part to the oscillatory motion of the first member to control the actuator as a generator charging the storing device during part of an operating cycle of the actuator, and
servo-controlling the motion of the mass part to the oscillatory motion of the first member to control the actuator as a motor supplied by the storing device during another part of the operating cycle of the actuator, wherein the operating cycle of the actuator comprises an operating phase of the actuator as a motor for increasing the motion speed of the mass part according to a predetermined direction during an increase of the acceleration of the first member according to a direction opposite to the predetermined direction.

3. The method according to claim 2, wherein servo-controlling to control the actuator as a generator relates to the motion speed of the mass part slaved to the acceleration of the first member.

4. The method according to claim 2, wherein the operating cycle of the actuator includes:
an operating phase of the actuator as a generator for decreasing the motion speed of the mass part according to the predetermined direction during a decrease of the acceleration of the first member according to the opposite direction,
an operating phase of the actuator as a motor for increasing the motion speed of the mass part according to the opposite direction during an increase of the acceleration of the first member according to the predetermined direction, and
an operating phase of the actuator as a generator for decreasing the motion speed of the mass part according to the opposite direction during a decrease of the acceleration of the first member according to the predetermined direction.

5. The method according to claim 2, wherein the operating cycle of the actuator includes operating phases for the actuator as a motor to increase and decrease the motion speed of the mass part when the acceleration of the first member varies around a maximum.

6. An electric power generating device including
an actuator electrically connected to an electric power storing device and comprising a first member able to be submitted to an oscillatory speed motion and a second member making up at least partially a mass part able to oscillate in speed with respect to the first member, and a servo-control system for controlling the actuator as a generator charging the storing device, by slaving the motion of the mass part to the oscillatory motion of the first member during a part of an operating cycle of the actuator, and for controlling the actuator as a motor supplied by the storing device for another part of the operating cycle of the actuator, wherein said servo control system is configured to operate the actuator as a motor for increasing the motion speed of the mass part according to a predetermined direction during an increase of the acceleration of the first member according to a direction opposite to the predetermined direction.

7. The device according to claim 6, wherein the servo-control system includes an accelerometer for measuring an acceleration of the first member, a speed sensor for measuring a motion speed of the mass part, and a controller for controlling the actuator for making the motion speed of the mass part slaved to the acceleration of the first member.

8. The device according to claim 7, wherein the servo-control system includes another controller for correcting a parameter depending on the measured acceleration of the first member and the measured motion speed of the mass part with respect to a variable set point depending on the position of the first member, and a reversible amplifier-undulator for adapting the variations of the electric power either to be recovered from the actuator or to be supplied to the actuator to direct current and voltage on the terminals of the storing device according to the corrected parameter.

9. The device according to claim 6, wherein the motion of the mass part is rotating and the actuator is rotating.

10. The device according to claim 9, wherein the servo-control system is able to vary the motion speed of the mass part around a nominal speed higher than the maximum angular speed of the first member.

11. The device according to claim 10, including means for rotatably uncoupling a housing supporting the actuator from the first member.

12. The device according to claim 6, including a spring fastened to a housing supporting the actuator for assisting the actuator to accelerate the mass part when the actuator operates as a motor.

13. The device according to claim 6, wherein the mass part includes, in a removable manner, at least a part of a mobile terminal connected to the storing device.

14. The method according to claim 1, wherein servo-controlling to control the actuator as a generator relates to the motion speed of the mass part slaved to the acceleration of the first member.

* * * * *

UNITED STATES PATENT AND TRADEMARK OFFICE
CERTIFICATE OF CORRECTION

PATENT NO. : 8,823,188 B2  
APPLICATION NO. : 12/988850  
DATED : September 2, 2014  
INVENTOR(S) : Daniel Sadarnac Page 1 of 1

It is certified that error appears in the above-identified patent and that said Letters Patent is hereby corrected as shown below:

In the specification

In column 5 at line 29, Change "walkers" to --walker's--.

In column 5 at line 66, Change "walkers" to --walker's--.

In column 13 at line 43, Change "$d\theta_y/dt = 2\pi f \theta_Y \cos(2\pi ft - \pi/2) = 2\pi ft \theta_Y \sin(2\pi ft)$," to --$d\theta_y/dt = 2\pi f \theta_Y \cos(2\pi ft - \pi/2) = 2\pi f \theta_Y \sin(2\pi ft)$--.

In column 14 at line 3, Change "$d^2\theta_x/dt^2 = -4\pi^2 f^2 \theta_x \sin(2\pi ft...$," to --$d^2\theta_x/dt^2 = -4\pi^2 f^2 \theta_x \sin(2\pi ft)$--.

In column 14 at line 61, Change "walkers" to --walker's--.

In column 15 at line 14, Change "walkers" to --walker's--.

In column 15 at line 59, Change "walkers" to --walker's--.

In column 16 at line 42, Change "de$\theta$y/dt" to --d$\theta$y/dt--.

Signed and Sealed this  
Fifteenth Day of December, 2015

Michelle K. Lee  
*Director of the United States Patent and Trademark Office*